2,600,893

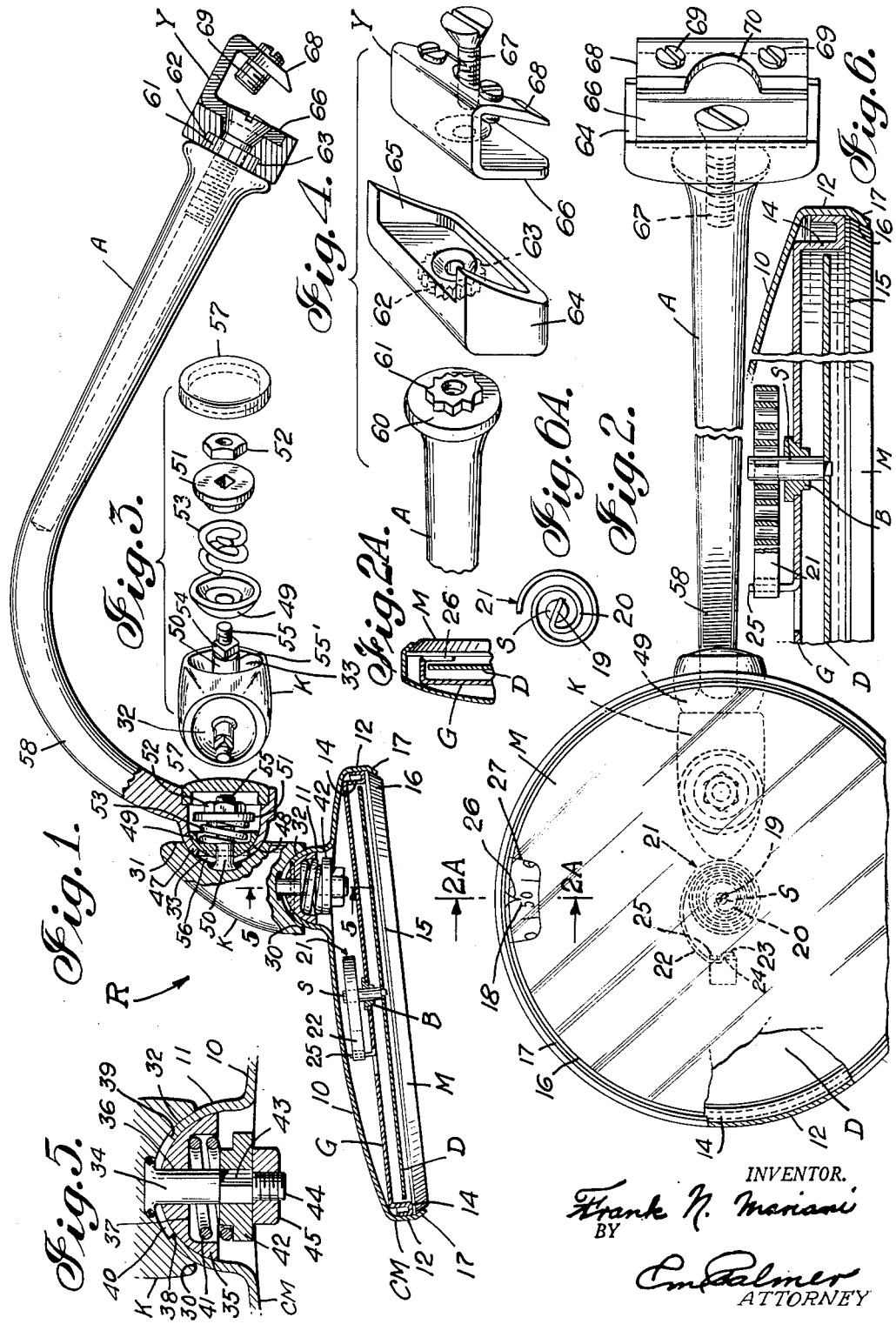
June 17, 1952 — F. N. MARIANI — 2,600,893
KNUCKLE JOINT FOR REARVISION REFLECTORS
Filed May 14, 1947 — 2 SHEETS—SHEET 1
INVENTOR.
Frank N. Mariani
BY
Cm Palmer
ATTORNEY June 17, 1952  F. N. MARIANI  2,600,893
KNUCKLE JOINT FOR REARVISION REFLECTORS
Filed May 14, 1947  2 SHEETS—SHEET 2
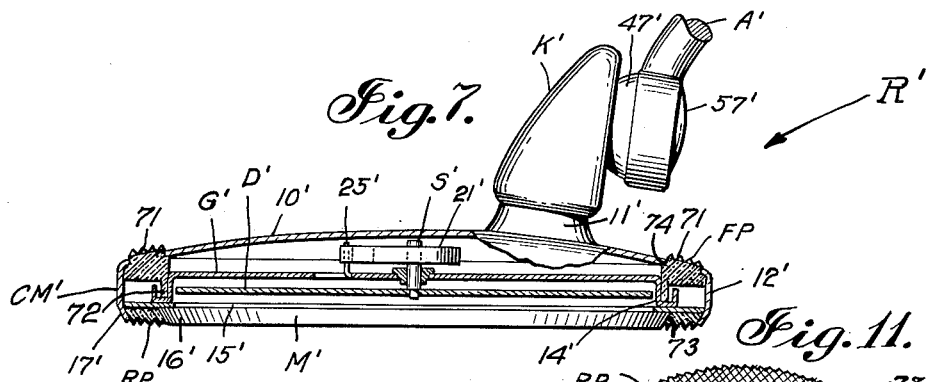
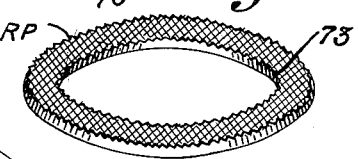
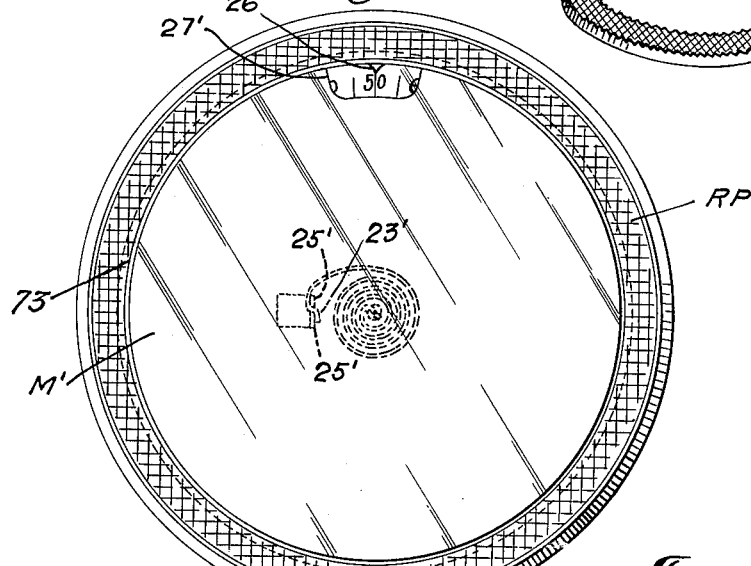
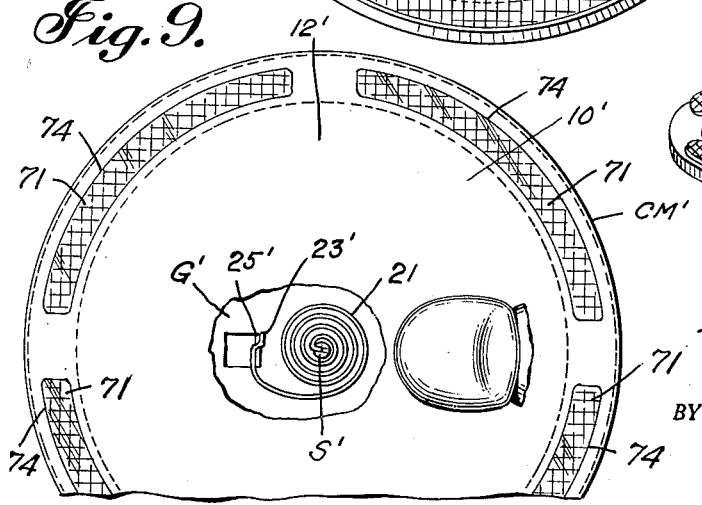
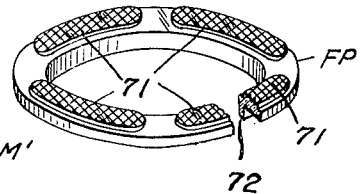
Frank N. Mariani
INVENTOR.
BY
Em Palmer
ATTORNEY Patented June 17, 1952

UNITED STATES PATENT OFFICE 2,600,893

KNUCKLE JOINT FOR REARVISION REFLECTORS

Frank N. Mariani, New York, N. Y.

Application May 14, 1947, Serial No. 747,993

4 Claims. (Cl. 287—1)

The subject matter of this invention is an improved and serviceable rear vision reflector conveniently adapted for mounting on a vehicle and more particularly is concerned with a novel rear view reflector to aid in the proper and safe steering of an automotive vehicle to which the reflector is advantageously attached. One important object of the invention is realized in the provision of a rear vision reflector comprising a knuckle or intervenor characterizing with a mirror carrying casing and with an arm adapted to be mounted on a vehicle, spaced universal ball and socket connections advantageously permitting the mirror carrying casing to be rotatably and tiltably adjusted relative to the knuckle and permitting the latter to be rotatably and tiltably displaced relative to the arm for conveniently setting the mirror carrying casing and consequently the mirror of the latter to an appropriate angular position for reflecting the desired rear view required by the operator of the vehicle. The invention has as a further object to provide a tiltable and rotatable mirror casing having a novel thermometer in part desirably accessible for view by the operator as the latter drives the vehicle. The invention has as a further and important object to provide a rear vision reflector, front and rear annular optical prisms for impinging reflecting and distributing beams of light rays at the front and rear of the rear vision reflector to characterize signal means to approaching and other vehicles at the front and rear of the operator. The invention further comprehends as an object the provision of a rear vision reflector conveniently adapted to be mounted on either the left or right hand part of the automotive vehicle. Other important and salient objects, advantages, and functional and structural features of the invention will appear from the following detailed specification considered in the light of the accompanying drawings wherein:

Fig. 1 is a side view of a rear vision reflector according to one embodiment of my invention, shown partly broken away and partly in section.

Fig. 2 is a rear elevational view of Fig. 1 however also shown partly broken away.

Fig. 2A is a sectional view on the line 2A—2A of Fig. 2.

Fig. 3 is an exploded and perspective view of the knuckle or socket and several parts associated therewith for clamping the goose neck or supporting arm illustrated in Fig. 1.

Fig. 4 is an exploded and perspective view of the lower part of the supporting arm, the shoe non-rotatably held thereto and the yoke or bracket for clamping a part of the vehicle.

Fig. 5 is an enlarged sectional view on the line 5—5 of Fig. 1.

Fig. 6 is an enlarged and fragmentary view of Fig. 1.

Fig. 6A is an enlarged fragmentary plan view of Fig. 1.

Fig. 7 is a fragmentary view of Fig. 1, however illustrating another embodiment according to the invention wherein spaced annular prisms are carried by the mirror casing.

Fig. 8 is a rear view of Fig. 7.

Fig. 9 is a fragmentary front view of Fig. 7.

Fig. 10 is a perspective and broken view of the annular and front prism.

Fig. 11 is a perspective view of the rear prism.

Illustrative of the embodiments disclosed, the rear vision reflector is generally designated R and comprises, the mirror casing CM, the compound knuckle or socket K, the supporting arm or gooseneck A, and the yoke or bracket Y.

The mirror casing CM is hollow and is characterized by a rear arcuate sheet metal wall 10 having the outwardly extending semi-spheroidal hollow boss or bulbous portion 11. The hollow casing CM also embodies the annular flange 12 closely and frictionally and non-rotatably surrounding the annular and hollow rim or flange 14 of the channeled shaped insert or chassis G. An annular paper or fibre gasket or washer 15 is arranged against the rim 14 against which is seated the mirror M which has the beveled face 16 retained securely by the inclined annular lip 17 bent inwardly from the annular flange 12 for holding the mirror firmly against the washer and the insert against the front wall 10 of the casing CM. By the present arrangement the insert and mirror are advantageously held against rotation within the casing CM.

Anchored to the insert or chassis G is the bearing B rotatably guiding the stub shaft S to which at one end is approximately fastened the graduated dial D having suitable indicia as 18. Shaft S has its other end slotted to interlock with the rectilinear terminal 19 of the inner coil 20 of the metal clock type spring 21 having its outer end 22 provided with an offset terminal 23 (Fig. 2) threaded through an opening 24 of the lug 25 struck out of the sheet metal guard G. By the construction shown and described the outer end of the coiled spring 21 is anchored to the guard while its inner end is anchored to the rotatable stub shaft S. Spring S is of the type that is readily responsive to temperature changes and expands and contracts in accordance with such changes or variations and consequently the shaft S is rotated. Therefore the indicia carrying dial D is rotatably displaced relative to the pointer or indicator 26 projecting radially and inwardly of the chassis or guard G and disposed in front of the dial to identify the displacement of the latter due to temperature changes. The readings may be read directly upon viewing of the mirror M in that a zone or portion 27 thereof is masked out, that is left unsilvered or transparent.

The knuckle or socket K is provided with a rear wall 30 and a side wall 31 substantially normal to the rear wall 30. Wall 30 is interrupted by the concavity or arcuate seat 32 and wall 31 embodies the race or arcuate seat 33.

Projecting rearwardly of the knuckle K and disposed co-axially of the arcuate seat 32 thereof and extending therethrough is the stem or shank 34 having its inner end fixedly anchored to the body of the knuckle.

Complementary to the inner curved surface of the hollow bulbous portion or semi-spheroidal projection or dome 11 is the clamping cup 35 interrupted by the cylindrical bore 36 and the recess 37. The stem 34 is cylindrical for its major part and projects through the bore 36 and cooperates with the ends 38 and 39 of the slot 40 in the projection or dome 11 to limit tiltable displacement of the casing CM.

Encircling the fixed stem or post 34 and in part confined within recess 38 is the helicoidal spring 41 seated on flange or collar 42 and non-rotatably mounted on the square shaped portion 43 of the the stem 34 which embodies the reduced and threaded end 44 on which clamping nut 45 is adjustably mounted. By this arrangement a universal ball and socket connection or joint is defined and the cup 35 thereof is yieldingly maintained but clamped against the displaceable bulbous portion or dome 11 and the latter therefore may be said to be rotatable and tiltably confined against the arcuate seat or concavity 32 although limited in its displacement by the ends 38 and 39 severally coacting with the anchored stem 34.

Rotatably and tiltably sustained against the arcuate concavity or race 33 of the knuckle K is the bulbous or semi-spheroidal hollow portion 47 whose outside convex surface is complementary to the inner concaved seat 33 and whose inside concaved seat 48 is complementary to the convex outer face of the recessed clamping member or cup 49 surrounding the laterally extending post or stem 50 substantially normal to the fixed shank 34 and fixedly anchored to the body of the knuckle K and projecting axially through and beyond seat 33 and into cup 49, the non-rotatable collar or flange 51, and the rotatable clamping nut 52. Spring 53 is interposed between the cup 49 and the flange or collar 51 and holds this cup in clamping relation against semi-spheroidal portion or projection 47 although flange 51 is non-rotatably mounted on the polygonal portion 54 while nut 52 mounted on the threaded and reduced terminal 55 holds the flange 51 in place against the shoulder 55'.

Referring back to knuckle K, walls 30 and 31 merge to define a corner which in Fig. 1 is shown at the lower right hand part of the body of the knuckle. Seat 32 interrupts wall 30; race 33 interrupts wall 31. Consequently the intermediate part of the body of the knuckle is reduced while that portion of the body of the knuckle most remote from the corner defined by the meeting surfaces or walls 30 and 31 is enlarged relative to the restricted or reduced portion intermediate the corner and the enlarged portion. Shank 34 extends from seat 32 and stem 50 projects from race 33. Shank 34 is substantially normal to stem 50 and the meeting surfaces 30 and 31 are substantially normal to each other.

It will be observed that the bulbous portion or ball 47 embodies a slot 56 and has ends adapted to severally cooperate with the fixed stem or shank 50 to limit rotational and tiltable displacement of the bulbous portion 47 relative to the knuckle K which together with the bulbous portions 11 and 47 define ball and socket connections or joints to permit the knuckle to be rotatably and tiltably displaced relative to the bulbous portion or "ball" 47 or the latter to be rotatably and tiltably displaced relative to the knuckle. A cap 57 frictionally and removably held cooperates to close the bulbous portion 47 which is at one end of the curved part or elbow 58 of the arm or gooseneck A having an enlarged base 60 provided with a fixed ratchet 61 interlocking with the teeth 62 of crown gear formed along the annular recess 63 of the non-rotatable shoe 64 having recess 65 for receiving and interlocking with leg 66 of the U-shaped yoke or bracket Y. A screw 67 fastens leg 66 to the shoe 64 and the latter against the base 60. Yoke 47 embodies the lip 68 carrying the spaced set screws 69 straddling the reentrant notch 70. By the present arrangement the yoke may be readily and securely fastened and clamped to a front part of the vehicle such as the flange of a door jamb. Thereafter the knuckle may be tilted and rotated relative to the bulbous portion 47 and the mirror casing CM may be tilted and/or rotated relative to the knuckle until the desired adjustment of the mirror is obtained. The herein rear vision reflector may be employed and mounted on either the right or left hand part of the vehicle and thereafter the mirror may be conveniently adjusted to any desired angle in a manner heretofore described.

In the form according to Figs. 7 to 11 inclusive, parts corresponding to the embodiment illustrated in Figs. 1–10 have been primed and front and rear annular prisms or jewels FP and PR are appropriately held by the casing CM' which is provided with the spaced arcuate openings 74 for receiving correspondingly shaped bosses or projections 71 of the annular prism FP having a depending annular and uninterrupted skirt 72 coacting to frictionally and non-rotatably retain the annular channeled rim 14' of the dished insert or guard G' against which the annular fibre washer 15' is arranged and held in place by the mirror M' and the annular rear prism RP when lip 17' is bent against the outer tapered face of the rear prism RP which includes an inner beveled or inclined face 73 cooperating with the inclined face 16' to retain the mirror against the guard.

Bosses 71 are provided with outside light impinging and reflecting teeth projecting forwardly thereof while light impinging and reflecting teeth project rearwardly of the prism RP which together with the prisms FP constitute supplementary reflector or light distributing optical jewels serving as signal means to approaching vehicles as is well understood. The prisms are of suitable glass and cut and processed to provide appropriate light impinging and reflecting teeth in a manner well known in the art. In other aspects the form illustrated in Figs. 7 to 11 is substantially along the lines of the species shown in Figs. 1–10.

Briefly recapitulating the multiple "knee action" provided by the spaced ball and socket connections or joints between the knuckle and the casing CM and the arm A permit a large range of adjustment of the mirror to conveniently collect the rear view as desired by the operator. Moreover since the knuckle is common to the mirror casing and the arm A, it merely slightly spaces these members apart and hence may be considered as an intervenor. Furthermore while both forms illustrated embody the thermometer this feature if desired may be eliminated and this may be said of the front and rear optical prisms illustrated.

Various changes may be made in details of construction and arrangement of parts without departing from the spirit of the invention or sacrificing any of the advantages thereof inherent therein.

I claim:

1. In combination, a knuckle embodying a corner and having two surfaces leading away from said corner, one of said surfaces having a reentrant arcuate seat and the other of said surfaces having a reentrant arcuate race, said knuckle having an enlarged portion and an intermediate reduced portion integral with said enlarged portion, said portions being in part bounded by said race and seat and said reduced portion embodying at one end thereof said corner, a stem fixed to said intermediate portion and extending axially of and through said seat and outside and beyond said knuckle, a shank anchored to said intermediate portion and projecting axially of and through said race and outside of and beyond said knuckle, a bulbous portion complementary to said seat and movably surrounding said stem, means tiltably and rotatably holding said bulbous portion to said seat, an arcuate boss complementary to said race and movably surrounding said shank, and means tiltably and rotatably holding said boss to said race.

2. In combination, a knuckle embodying a corner and having two surfaces substantially normal to each other and leading away from said corner, one of said surfaces having a reentrant arcuate seat and the other of said surfaces having a reentrant arcuate race, said knuckle having an enlarged portion and an intermediate reduced portion integral with said enlarged portion, said portions being in part bounded by said race and seat and said reduced portion embodying at one end thereof said corner, a stem fixed to said intermediate portion and extending axially of and through said seat and outside and beyond said knuckle, a shank disposed substantially normal to said stem and anchored to said intermediate portion and projecting axially of and through said race and outside of and beyond said knuckle, a bulbous portion complementary to said seat and movably surrounding said stem, means tiltably and rotatably holding said bulbous portion to said seat, an arcuate boss complementary to said race and movably surrounding said shank, and means tiltably and rotatably holding said boss to said race.

3. As a new article of manufacture, a knuckle embodying a corner and having two surfaces leading away from said corner, one of said surfaces having a reentrant arcuate seat and the other of said surfaces having a reentrant arcuate race, said knuckle having an enlarged portion and an intermediate reduced portion integral with said enlarged portion, said portions being in part bounded by said race and seat and said reduced portion embodying at one end thereof said corner, a stem fixed to said intermediate portion and extending axially of and through said seat and outside of and beyond said knuckle, and a shank anchored to said intermediate portion and projecting axially of and through said race and outside of and beyond said knuckle.

4. As a new article of manufacture, a knuckle embodying a corner and having two surfaces substantially normal to each other and leading away from said corner, one of said surfaces having a reentrant arcuate seat and the other of said surfaces having a reentrant arcuate race, said knuckle having an enlarged portion and an intermediate reduced portion integral with said enlarged portion, said portions being in part bounded by said race and seat and said reduced portion embodying at one end thereof said corner, a stem fixed to said intermediate portion and extending axially of and through said seat and outside of and beyond said knuckle, and a shank disposed substantially normal to said stem and anchored to said intermediate portion and projecting axially of and through said race and outside of and beyond said knuckle.

FRANK N. MARIANI.

REFERENCES CITED

The following references are of record in the file of this patent:

UNITED STATES PATENTS

| Number | Name | Date |
|---|---|---|
| 775,003 | Eustis | Nov. 15, 1904 |
| 1,528,082 | Schlaich | Mar. 3, 1925 |
| 1,537,039 | Short | May 5, 1925 |
| 1,909,526 | Falge et al. | May 16, 1933 |
| 2,112,656 | Ponce | Mar. 29, 1938 |
| 2,200,168 | Goldberg | May 7, 1940 |
| 2,265,792 | Allen | Dec. 9, 1941 |
| 2,333,671 | Peters et al. | Nov. 9, 1943 |